No. 797,777. PATENTED AUG. 22, 1905.
E. M. MARX.
NUT LOCK.
APPLICATION FILED JAN. 30, 1905.
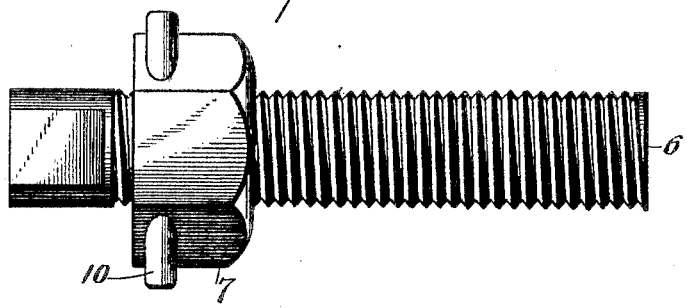
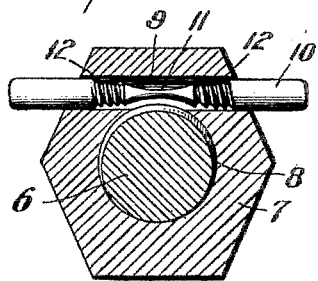
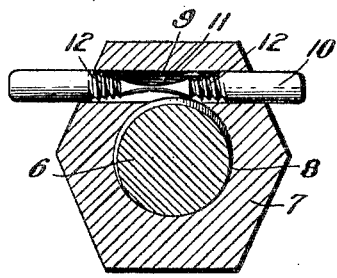
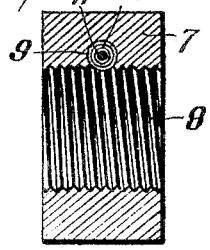
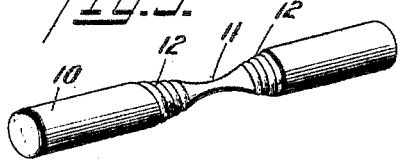
Witnesses
Ernest M. Marx Inventor
Attorney

UNITED STATES PATENT OFFICE.

ERNEST MAX MARX, OF BURNET, TEXAS, ASSIGNOR OF ONE-HALF TO EALY J. MOSES, OF BURNET, TEXAS.

NUT-LOCK.

No. 797,777.        Specification of Letters Patent.        Patented Aug. 22, 1905.

Application filed January 30, 1905. Serial No. 243,279.

*To all whom it may concern:*

Be it known that I, ERNEST MAX MARX, a citizen of the United States, residing at Burnet, in the county of Burnet and State of Texas, have invented a new and useful Nut-Lock, of which the following is a specification.

This invention relates to improvements in means for locking nuts against turning on bolts or other threaded shanks.

The principal object is to provide a simple structure of a novel nature which will efficiently secure a nut against revolution on a threaded shank, will not materially injure the threads of said shank, may be readily made effective to lock the nut, may as conveniently be operated to release said nut in order to effect its turning, requires no particular or fine adjustment, and is of such a simple nature that it is not liable to become deranged or inoperative.

One form of the invention is illustrated in the accompanying drawings, wherein—

Figure 1 is a view in elevation of a threaded shank with the nut thereon, the latter being supplied with the improved locking means. Fig. 2 is a cross-sectional view through the structure illustrated in Fig. 1, showing the nut free to rotate. Fig. 3 is a similar view, but illustrating the nut locked against rotation on the shank. Fig. 4 is a sectional view through the nut at right angles to Figs. 2 and 3. Fig. 5 is a detail perspective view of the locking-dog.

Similar reference-numerals designate corresponding parts in all the figures of the drawings.

In the embodiment illustrated a threaded shank 6 is employed, upon which is located a nut 7, said nut having the usual bore 8, the walls of which are threaded to receive the threads of the shank. This nut is provided with a transverse open-ended opening 9, which intersects one side of the bore and is consequently in communication therewith and receives the threads, as shown in Figs. 2 and 3.

A locking-dog 10 in the form of a stem or rod is longitudinally slidable in the opening 9 and has between its ends a reduced portion, forming an annular groove or recess 11, the reduced portion being curved, as shown, to correspond to the curvature of the threads and permitting the free passage of said threads through the opening when the recess is in alinement therewith. The locking-dog is provided at the opposite sides of the recess with annular teeth 12, which taper toward the recess and are shown in the form of threads, though annular circular teeth may be employed, as will be apparent. The depth of the said teeth 12 is less than that of the threads of the shank. The stem 10 may be of any length desired.

By referring to Fig. 2 it will be clear that as long as the recess 11 is alined with the communication between the opening 9 and the bore 8 the nut can be threaded freely in either direction; but when it is desired to lock said nut against rotation on the shank the stem 10 is moved longitudinally in one direction or the other, and thus the recess is carried out of alinement with the socket, while the teeth 12 are brought into engagement with the threads. The said teeth will bite into these threads, the material of the stem being harder than that of the shank, and consequently the nut will be locked against rotation. To release the said nut, it is only necessary to again move the stem so that the recess receives the threads of the shank. By means of the particular construction of the stem the same may be fitted loosely within the transverse opening of a nut, and no matter how much it is rotated the mere longitudinal movement will always bring either the recess or one set of teeth into coaction with the threads on the shank. The device is, moreover, locked in the nut by means of said shank, and while the teeth may roughen the edges of the threads they cannot cut entirely through the same, and thus mutilate said threads to such a degree that the nut will not freely screw upon the same.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a nut-lock, the combination with a threaded shank, of a nut having a bore to receive the shank and an opening transverse to and intersecting one side of the bore, and a locking-dog slidable longitudinally and also rotatable in the opening, said dog having a transverse recess in different sides that alines with the bore and permits the free passage of the threads and furthermore having a transverse tooth at one end of the recess and extending about the sides of the dog having the recess, said recess moving out of alinement with the bore, and said tooth moving into engagement with the threads of the shank upon the longitudinal sliding movement of the dog, the said dog being rotatable to bring different portions of the tooth into coaction with the threads.

2. In a nut-lock, the combination with a threaded shank, of a nut having a bore to receive the shank and an opening transverse to and intersecting one side of the bore, the threads of said shank entering the opening, and a locking-dog having an annular recess that permits the free passage of the threads, said dog furthermore having a tooth extending around the same, said tooth being located at one end of the recess and movable into engagement with the threads upon the movement of the dog in the opening.

3. In a nut-lock, the combination with a threaded shank, of a nut having a bore to receive the shank and an opening transverse to and intersecting one side of the bore, said opening having both ends open, and a locking-dog slidable longitudinally in the opening and having an annular recess between its end that alines with the bore and permits the free passage of the threads, said dog furthermore having teeth extending around the same at the opposite ends of the recess, which teeth move into engagement with the threads on the shank upon the longitudinal sliding movement of the dog.

4. In a nut-lock, the combination with a threaded shank, of a nut having a bore that receives the shank and an open-ended opening swinging transversely of said bore and intersecting one side of the same, the threads of the shank entering the opening, a longitudinally-slidable locking-dog mounted in the opening and having an annular recess between its ends that alines with the bore and permits the free passage of the threads, and teeth extending around the dog, said teeth being located at the ends of said recess and tapering toward the same, the teeth being of less depth than the depth of the threads of the shank and said teeth being movable into engagement with the said threads upon the longitudinal sliding movement of the locking-dog in either direction.

In testimony that I claim the foregoing as my own I have hereto affixed my signature in the presence of two witnesses.

ERNEST MAX MARX.

Witnesses:
J. T. CHAMBERLAIN,
GEO. T. LAMON.